(12) United States Patent
Huth et al.

(10) Patent No.: US 11,542,917 B2
(45) Date of Patent: Jan. 3, 2023

(54) BEAM STRUCTURE FOR A SEGMENTED ROTOR BLADE HAVING A TRANSITIONING SHAPE

(71) Applicant: General Electric Company, Schenectady, NY (US)

(72) Inventors: Scott Jacob Huth, Greenville, SC (US); Xu Chen, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/413,086

(22) PCT Filed: Dec. 11, 2018

(86) PCT No.: PCT/US2018/064844
§ 371 (c)(1),
(2) Date: Jun. 11, 2021

(87) PCT Pub. No.: WO2020/122866
PCT Pub. Date: Jun. 18, 2020

(65) Prior Publication Data
US 2022/0010768 A1 Jan. 13, 2022

(51) Int. Cl.
*F03D 1/06* (2006.01)
(52) U.S. Cl.
CPC ........ *F03D 1/0683* (2013.01); *F05B 2230/50* (2013.01); *F05B 2240/302* (2013.01)
(58) Field of Classification Search
CPC .............. F03D 1/0675; F03D 1/0683; F05B 2240/302; F05B 2280/6003
See application file for complete search history.

(56) References Cited

U.S. PATENT DOCUMENTS

| | | |
|---|---|---|
| 851,196 A | 4/1907 | Bevans et al. |
| 4,474,536 A | 10/1984 | Gougeon et al. |
| (Continued) | | |

FOREIGN PATENT DOCUMENTS

| | | |
|---|---|---|
| EP | 2186622 A1 | 5/2010 |
| EP | 3144526 A1 | 3/2017 |
| (Continued) | | |

OTHER PUBLICATIONS

International Search Report PCT/US2018/064844 dated Aug. 14, 2019.

*Primary Examiner* — Courtney D Heinle
*Assistant Examiner* — Sang K Kim
(74) *Attorney, Agent, or Firm* — Dority & Manning, P.A.

(57) ABSTRACT

A spar assembly for a rotor blade including a beam structure extending between a closed first end and a second end configured for coupling within a shell of the rotor blade. The beam structure includes a contacting portion extending in a span-wise direction from the second end, a joint portion extending in the span-wise direction from the first end toward the contacting portion, and a transition region between the contacting portion and the joint portion. The contacting portion includes one or more contoured surfaces oriented toward at least one of an internal surface of a pressure or suction side of the rotor blade and configured to follow a contour of one of the pressure or suction side of the rotor blade. The joint portion includes one or more linear surfaces oriented in the same direction as the contoured surface(s). The transition region transitions the contoured surface(s) to the linear surface(s).

20 Claims, 6 Drawing Sheets

(56) References Cited

U.S. PATENT DOCUMENTS

| | | | |
|---|---|---|---|
| 4,643,646 | A | 2/1987 | Hahn et al. |
| 4,732,542 | A | 3/1988 | Hahn et al. |
| 5,281,454 | A | 1/1994 | Hanson |
| 7,334,989 | B2 | 2/2008 | Arelt |
| 7,344,360 | B2 | 3/2008 | Wetzel |
| 7,901,188 | B2 | 3/2011 | Llorente Gonzalez et al. |
| 7,922,454 | B1 | 4/2011 | Riddell |
| 7,927,077 | B2 | 4/2011 | Olson |
| 7,997,874 | B2 | 8/2011 | van der Bos |
| 7,998,303 | B2 | 8/2011 | Baehmann et al. |
| 8,123,488 | B2 | 2/2012 | Finnigan et al. |
| 8,231,351 | B2 * | 7/2012 | Nies ................ F03D 1/065 416/146 R |
| 8,297,932 | B2 | 10/2012 | Arocena De La Rua et al. |
| 8,348,622 | B2 | 1/2013 | Bech |
| 8,356,982 | B2 | 1/2013 | Petri Larrea et al. |
| 8,376,713 | B2 | 2/2013 | Kawasetsu et al. |
| 8,388,316 | B2 | 3/2013 | Arocena De La Rua et al. |
| 8,517,689 | B2 | 8/2013 | Kyriakides et al. |
| 8,919,754 | B2 | 12/2014 | Schibsbye |
| 9,669,589 | B2 | 6/2017 | Zamora Rodriguez et al. |
| 10,451,030 | B2 * | 10/2019 | Hayden ............. F03D 1/0675 |
| 2007/0018049 | A1 | 1/2007 | Stuhr |
| 2007/0253824 | A1 | 11/2007 | Eyb |
| 2009/0116962 | A1 | 5/2009 | Pedersen et al. |
| 2009/0155084 | A1 | 6/2009 | Livingston et al. |
| 2009/0162208 | A1 | 6/2009 | Zirin et al. |
| 2010/0132884 | A1 | 6/2010 | Baehmann et al. |
| 2010/0215494 | A1 | 8/2010 | Bech et al. |
| 2010/0304170 | A1 | 12/2010 | Frederiksen |
| 2011/0052403 | A1 | 3/2011 | Kawasetsu et al. |
| 2011/0081247 | A1 | 4/2011 | Hibbard |
| 2011/0081248 | A1 | 4/2011 | Hibbard |
| 2011/0091326 | A1 | 4/2011 | Hancock |
| 2011/0158788 | A1 | 6/2011 | Bech et al. |
| 2011/0158806 | A1 | 6/2011 | Arms et al. |
| 2011/0229336 | A1 | 9/2011 | Richter et al. |
| 2012/0093627 | A1 | 4/2012 | Christenson et al. |
| 2012/0196079 | A1 | 8/2012 | Brauers et al. |
| 2012/0213642 | A1 | 8/2012 | Wang et al. |
| 2012/0269643 | A1 | 10/2012 | Hibbard et al. |
| 2012/0308396 | A1 | 12/2012 | Hibbard |
| 2013/0040151 | A1 | 2/2013 | Jeromerajan et al. |
| 2013/0064663 | A1 | 3/2013 | Loth et al. |
| 2013/0129518 | A1 | 5/2013 | Hayden et al. |
| 2013/0164133 | A1 | 7/2013 | Grove-Nielsen |
| 2013/0177433 | A1 | 7/2013 | Fritz et al. |
| 2013/0189112 | A1 | 7/2013 | Hedges et al. |
| 2013/0189114 | A1 | 7/2013 | Jenzewski et al. |
| 2013/0219718 | A1 | 8/2013 | Busbey et al. |
| 2013/0224032 | A1 | 8/2013 | Busbey et al. |
| 2013/0236307 | A1 | 9/2013 | Stege |
| 2013/0236321 | A1 | 9/2013 | Olthoff |
| 2014/0286780 | A1 | 9/2014 | Lemos et al. |
| 2015/0204200 | A1 | 7/2015 | Eyb et al. |
| 2015/0369211 | A1 | 12/2015 | Merzhaeuser |
| 2017/0122287 | A1 * | 5/2017 | Dobbe ............... B29C 66/1162 |
| 2018/0051672 | A1 * | 2/2018 | Merzhaeuser ........ F03D 1/0675 |
| 2018/0135602 | A1 | 5/2018 | Tobin et al. |
| 2018/0274521 | A1 | 9/2018 | Akhtar et al. |
| 2020/0040868 | A1 * | 2/2020 | Broome ............... F03D 1/0675 |
| 2020/0088172 | A1 * | 3/2020 | Scholte-Wassink ........ F03D 1/0675 |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

* cited by examiner

BEAM STRUCTURE FOR A SEGMENTED ROTOR BLADE HAVING A TRANSITIONING SHAPE

FIELD

The present disclosure relates generally to wind turbines, and more particularly to a beam structure for a segmented rotor blade having a transitioning cross-sectional shape along a span of the rotor blade to improve manufacturability.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance, and strength) which are not configured to withstand the bending moments and other loads exerted on the rotor blade during operation. Thus, to increase the stiffness, buckling resistance, and strength of the rotor blade, the body shell is typically reinforced using one or more structural components (e.g., opposing spar caps with a shear web configured therebetween) that engage the inner pressure and suction side surfaces of the shell halves. Such structural components typically are contoured to the shapes of the inner pressure and suction side surfaces of the shell halves in order to form a strong bond between the structural components and each shell half. The spar caps and/or shear web may be constructed of various materials, including but not limited to glass fiber laminate composites and/or carbon fiber laminate composites.

Various rotor blades may be divided into two or more segments and assembled to form a completed rotor blade. Each segment of a segmented rotor blade generally includes suction and pressure side shells and one or more structural components. Such segments and their respective components are typically assembled at joints between segments. While contouring the shape of the structural components to the shapes of the pressure and suction side shell halves may create a desirable bond between the structural components and the shells, such shapes may be undesirable for the ends of the structural components intended to join the blade segments together. More particularly, the curved profile of the structural component may lead to delamination of composite materials forming the ends of the structural components.

Accordingly, the present disclosure is directed to a beam structure for a segmented rotor blade of a wind turbine having a transitioning cross-sectional shape along a span of the rotor blade to improve manufacturability.

BRIEF DESCRIPTION

Aspects and advantages of the invention will be set forth in part in the following description, or may be obvious from the description, or may be learned through practice of the invention.

In one aspect, the present disclosure is directed to a spar assembly for a rotor blade of a wind turbine. The spar assembly includes a beam structure extending between a closed first end and a second end. The beam structure is configured for coupling within a shell of the rotor blade. The beam structure includes a contacting portion extending in a span-wise direction from the second end and includes one or more contoured surfaces oriented toward at least one of an internal surface of a pressure side or a suction side of the rotor blade. Further, the contoured surface(s) is configured to follow a contour of one of the pressure side or the suction side of the rotor blade. The beam structure further includes a joint portion extending in the span-wise direction from the first end toward the contacting portion. The joint portion includes one or more linear surfaces oriented in the same direction as the contoured surface(s). The beam structure includes a transition region between the contacting portion and the joint portion that transitions the contoured surface(s) to the linear surface(s).

In one embodiment, the contacting portion may extend along 50% or less of a length of the beam structure. In one such embodiment, the transition region may extend from about 30% to about 40% of the length of the beam structure.

In another embodiment, the contoured surface(s) may include a first radius of curvature, and the transition region may include a second radius of curvature greater than the first radius of curvature. In additional embodiments, the transition region may include a plurality of radii of curvature arranged between the contacting portion and the joint portion. Moreover, each radius of curvature of the plurality of radii of curvature may increase between the contacting portion and the joint portion.

In one embodiment, the contoured surface(s) may be formed integrally with the beam structure or separately attached to the beam structure. In another embodiment, the contacting portion of the beam structure may further include a plurality of contoured surfaces. The plurality of contoured surfaces may include a first contoured surface oriented toward the internal surface of the suction side of the rotor blade and a second contoured surface oriented toward the internal surface of the pressure side of the rotor blade. In one such embodiment, the joint portion of the beam structure may further include a plurality of linear surfaces. Additionally, the plurality of linear surfaces may include a first linear surface oriented toward the internal surface of the suction side of the rotor blade and a second linear surface oriented toward the internal surface of the pressure side of the rotor blade. In one such embodiment, the transition region may transition the first and second contoured surfaces into the first and second linear surfaces.

In another such embodiment, the first and second contoured surfaces may form part of a suction side spar cap and a pressure side spar cap, respectively. Moreover, the beam structure may further include one or more shear webs extending between the suction side spar cap and the pressure side spar cap. In an additional embodiment, the beam structure may further include one or more internal blocks, internal plies, external plies, or combinations thereof. As such, at least one of the internal block(s), internal ply(ies), or external ply(ies) may be pre-formed or pre-fabricated and laid up with the beam structure.

In yet another aspect, the present disclosure is directed to a rotor blade for a wind turbine. The rotor blade includes a first blade segment and a second blade segment extending in opposite directions from a chord-wise joint. Each of the first and second blade segments include a pressure side shell member, a suction side shell member, and a spar assembly. The spar assembly of the first blade segment includes a beam structure extending between a closed first end at the chord-wise joint and a second end. Additionally, the beam structure is configured for coupling within a shell of the rotor blade. The beam structure includes a contacting portion extending in a span-wise direction from the second end. The contacting portion includes one or more contoured surfaces oriented toward at least one of an internal surface of the pressure side shell member or the suction side shell member. Moreover, the contoured surface(s) is configured to follow a contour of one of the pressure side shell member or the suction side shell member. The beam structure further includes a joint portion extending in the span-wise direction from the first end toward the contacting portion. The joint portion includes one or more linear surfaces oriented in the same direction as the contoured surface(s). The beam structure further includes a transition region between the contacting portion and the joint portion that transitions the contoured surface(s) to the linear surface(s). It should be understood that the rotor blade may further include any of the additional features as described herein.

In yet another aspect, the present disclosure is directed to a method of forming a beam structure of a spar assembly for a rotor blade. Such a rotor blade includes a pressure side shell member and a suction side shell member. The method includes forming a contacting portion of the beam structure extending in a span-wise direction from a second end. The contacting portion is formed to include one or more contoured surfaces oriented toward at least one of an internal surface of the pressure side shell member or the suction side shell member. Further, the contoured surface(s) is configured to follow a contour of one of the pressure side shell member or the suction side shell member. The method additionally includes forming a joint portion of the beam structure extending in the span-wise direction from a closed first end of the beam structure toward the contacting portion. Additionally, the joint portion is formed to include one or more linear surface oriented in the same direction as the contoured surface(s). The method further includes, forming a transition region between the contacting portion and the joint portion that transitions the contoured surface(s) to the linear surface(s). One step of the method includes wrapping one or more of composite plies from the linear surface(s) of the joint portion around the first end of the joint portion to form the closed end of the beam structure. The method further includes processing the beam structure. It should be understood that the rotor blade may further include any of the additional features as described herein.

In one embodiment of the method, forming the contacting portion and/or the transition region may include laying up the contacting portion and/or the transition region in a hard tool. In such an embodiment, the hard tool may define the contoured surface(s), the transition region, or both. In another embodiment, forming the contacting portion and/or the transition region may include laying up the contacting portion and/or the transition region around an internal tooling mandrel. In such an embodiment, the tooling mandrel may be configured to define the contoured surface(s), the transition region, or both.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
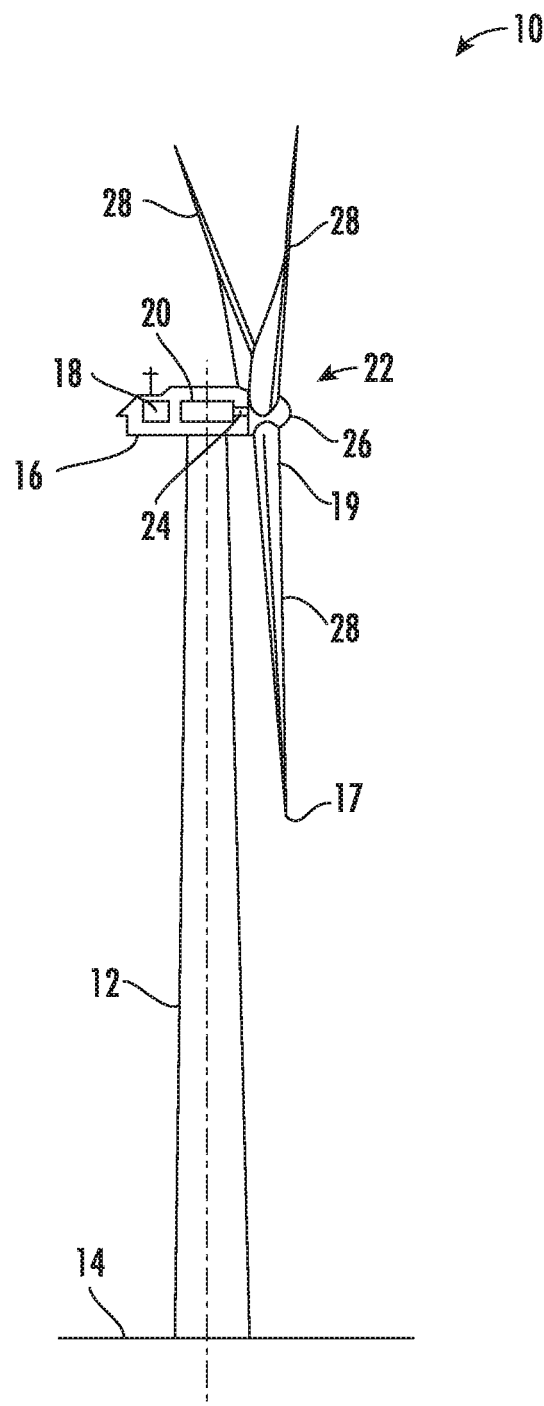
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
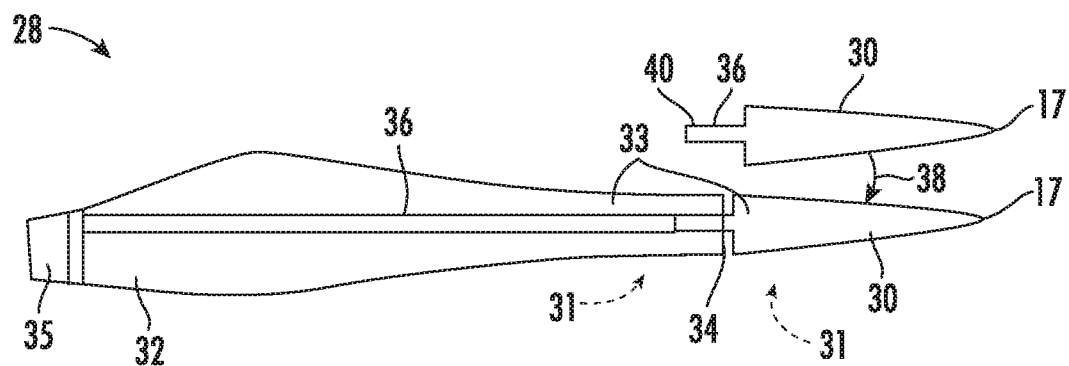
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include a pressure side shell member 31, a suction side shell member 33, and an internal spar assembly 36. The first blade segment 30 and the second blade segment 32 may be connected by at least an internal beam structure 40 of the internal spar assembly 36 of the first blade segment 30 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal beam structure 40 into the second blade segment 32. For instance, the beam structure 40 of the first blade segment 30 may be inserted into the spar assembly 36 of the second blade segment 32. In addition, as shown, the spar assembly 36 of the second blade segment 32 may extend lengthways for connecting with a blade root section 35 of the rotor blade 28 and with the beam structure 40 of the first blade segment 30 (which is shown in more detail in FIG. 5).

Though depicted as part of a tip blade segment, it should be appreciated that the internal beam structure 40 may be included as part of a root blade segment and may be connected to an internal spar assembly 36 of a tip blade segment to facilitate joining of the blade segments 30, 32. In still further embodiments, the rotor blade 28 may include three or more blade segments. In such an embodiment, the internal spar assembly 36 of an intermediate blade segment may include the beam structure 40. For instance, a beam structure 40 may extend from one of or both of the ends of the intermediate segment to facilitate jointing the intermediate blade segment to a root segment and/or a tip segment of the segmented rotor blade 28.

Figure 3:
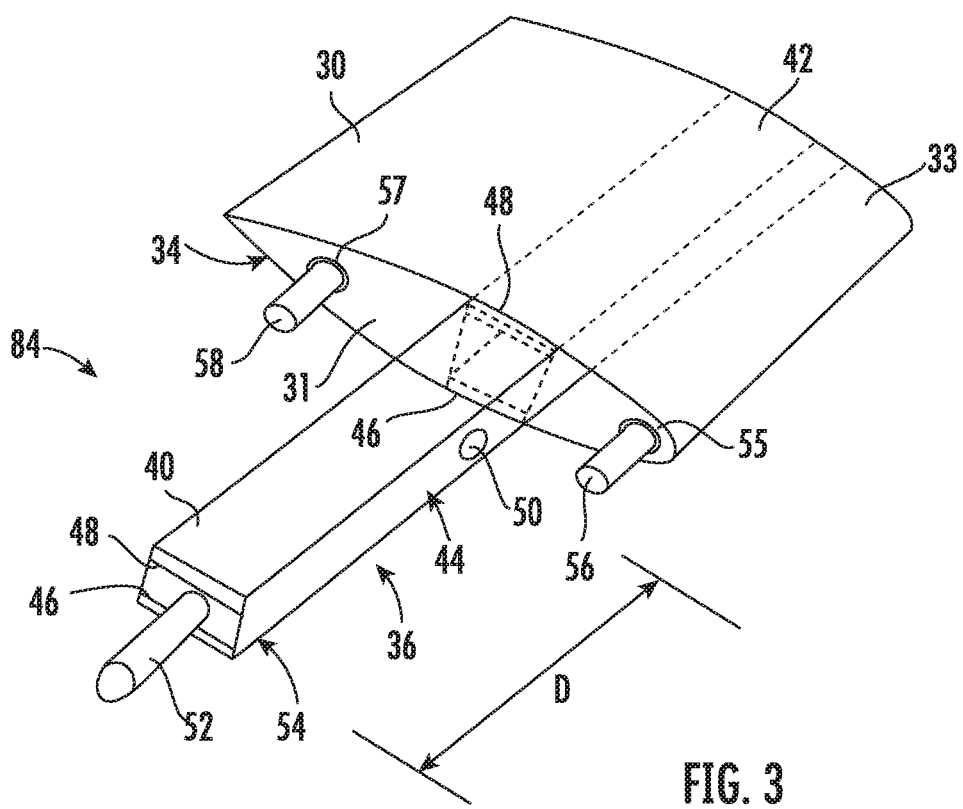
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 may include the beam structure 40 that forms a portion of the spar assembly 36 of the first blade segment 30 and extends lengthways for structurally connecting with the second blade segment 32. Further, as shown, the beam structure 40 may form a part of the first blade segment 30 having an extension (e.g., a joint portion 84 as described in more detail below in regards to FIGS. 6-8) protruding from an internal section 42 (e.g., a contacting portion 82 and a transition region 94 as explained in more detail below in regards to FIGS. 6 and 7), thereby forming an extending spar section. In certain embodiments, the beam structure 40 may include one or more shear webs 44 connected with a suction side spar cap 48 and a pressure side spar cap 46.

Moreover, as shown, the first blade segment 30 may include one or more first bolt joints towards a first end 54 of the beam structure 40. In one embodiment, the bolt joint may include a pin that is in a tight interference fit with a bush. More specifically, as shown, the bolt joint(s) may include one bolt tube 52 located on the beam structure 40. Thus, as shown, the bolt tube 52 may be oriented in a span-wise direction. Further, the first blade segment 30 may also include a bolt joint slot 50 located on the beam structure 40 proximate to the chord-wise joint 34. Moreover, as shown, the bolt joint slot 50 may be oriented in a chord-wise direction. In one example, there may be a bushing within the bolt joint slot 50 arranged in a tight interference fit with a bolt tube or pin. Further, the first blade segment 30 may include multiple second bolt joint tubes 56, 58 located at the chord-wise joint 34. Thus, as shown, the second bolt joint tubes 56, 58 may include a leading edge bolt joint tube 56 and a trailing edge bolt joint tube 58. Further, each of the second bolt joint tubes 56, 58 may be oriented in a span-wise direction. In addition, as shown, each of the second bolt joint tubes 56, 58 may include multiple flanges 55, 57, respectively, that are configured to distribute compression loads at the chord-wise joint 34.

It is to be noted that the bolt tube 52 located at the first end 54 of the beam structure 40 may be separated span-wise with the multiple second bolt joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the bolt joints connecting the first and second blade segments 30, 32 may include an interference-fit steel bushed joint.

Figure 4:
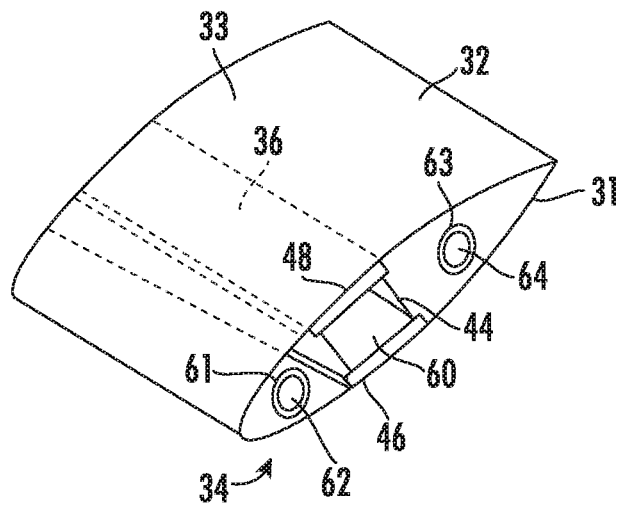
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthways within the second blade segment 32 for receiving the beam structure 40 of the first blade segment 30. The receiving section 60 may include the spar assembly 36 including a pressure side spar cap 46 and a suction side spar cap 48 and one or more shear webs 44 extending therebetween. The receiving section 60 may extend lengthways for connecting with the beam structure 40 of the first blade segment 30. For instance the beam structure 40 may be inserted within the receiving section 60. As shown, the second blade segment 32 may further include bolt joint slots 62, 64 for receiving bolt tubes 56, 58 (shown in FIG. 3) of the first blade segment 30 and forming tight interference fittings. In one example, each of the multiple bolt joint slots 62, 64 may include multiple flanges 61, 63, respectively, that are configured to distribute compression loads at the chord-wise joint 34.

Figure 5:
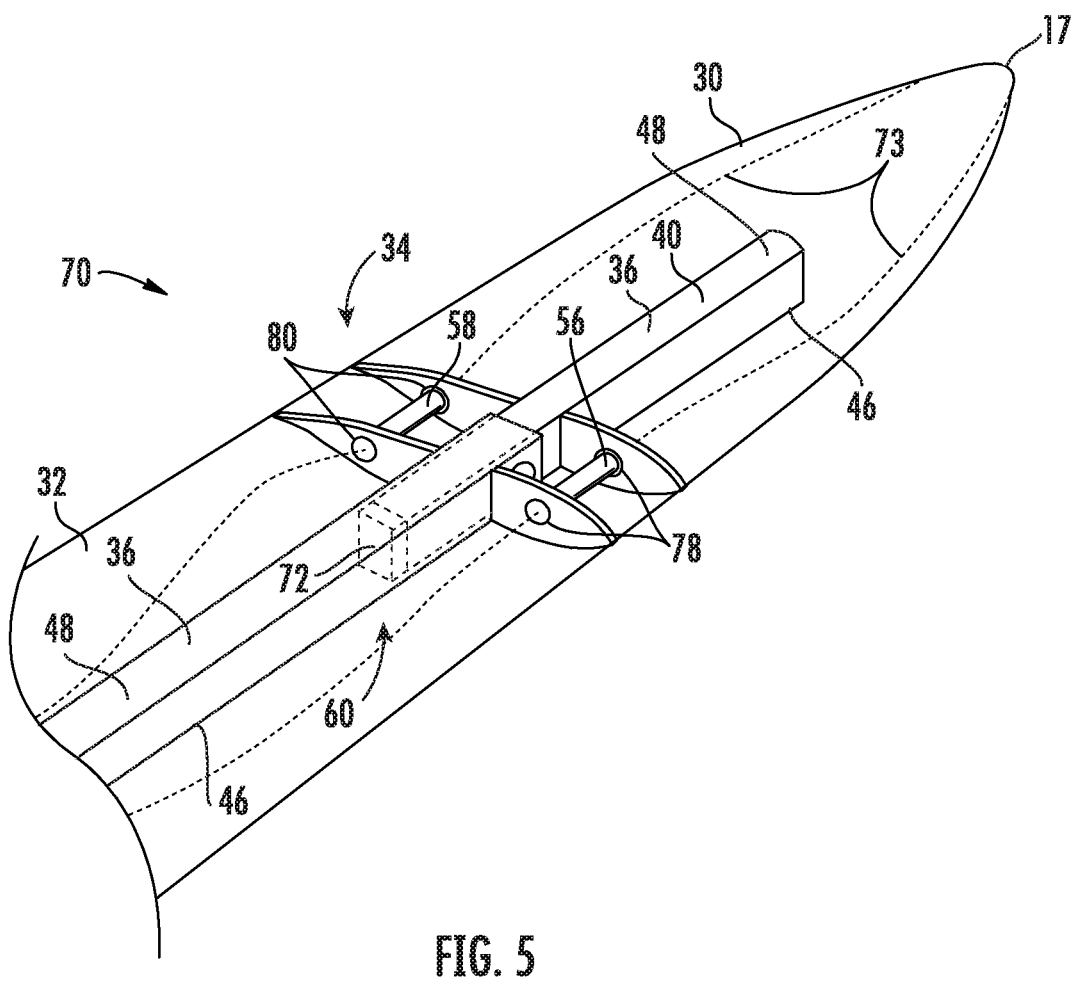
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 may include the suction side spar cap 48 and the pressure side spar cap 46 extending lengthways and supporting the beam structure 40. The receiving section 60 also includes a rectangular fastening element 72 that connects with the bolt tube 52 (see, e.g., FIG. 3) of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge bolt openings 78 and trailing edge bolt openings 80 that allows bolt joint connections between the first and second blade segments 30, 32. For example, as shown, the chord-wise members 74, 76 are connected by bolt tubes 56 and 58 that are in tight interference fit with bushings located in the leading edge bolt openings 78 and the trailing edge bolt openings 80. In another embodiment, each of the spar caps 46, 48, the rectangular fastening element 72, and the chord-wise members 74, 76 may be constructed of a composite material such as glass reinforced fibers or carbon reinforced fibers. In this example, the assembly 70 may also include multiple lightening receptor cables 73 that are embedded between the multiple bolt tubes or pins 56, 58 and the bushing connections attached to the chord-wise members 74, 76.

In other embodiments, it should be appreciated that the first blade segment 30 may be a root blade segment while the second blade segment 32 may be a tip blade segment. As such, the beam structure 40 may extend out of the distal end of the root blade segment and be received by a receiving section 60 of the tip blade segment. In still further embodiments, the first blade segment 30 may be an intermediate blade segment positioned between a root blade segment and a tip blade segment. Further, such an intermediate blade segment may include a beam structure 40 extending from one or both ends to be received (e.g., inserted) within a receiving section 60 of the root blade segment and/or the tip blade segment.

Figure 6:
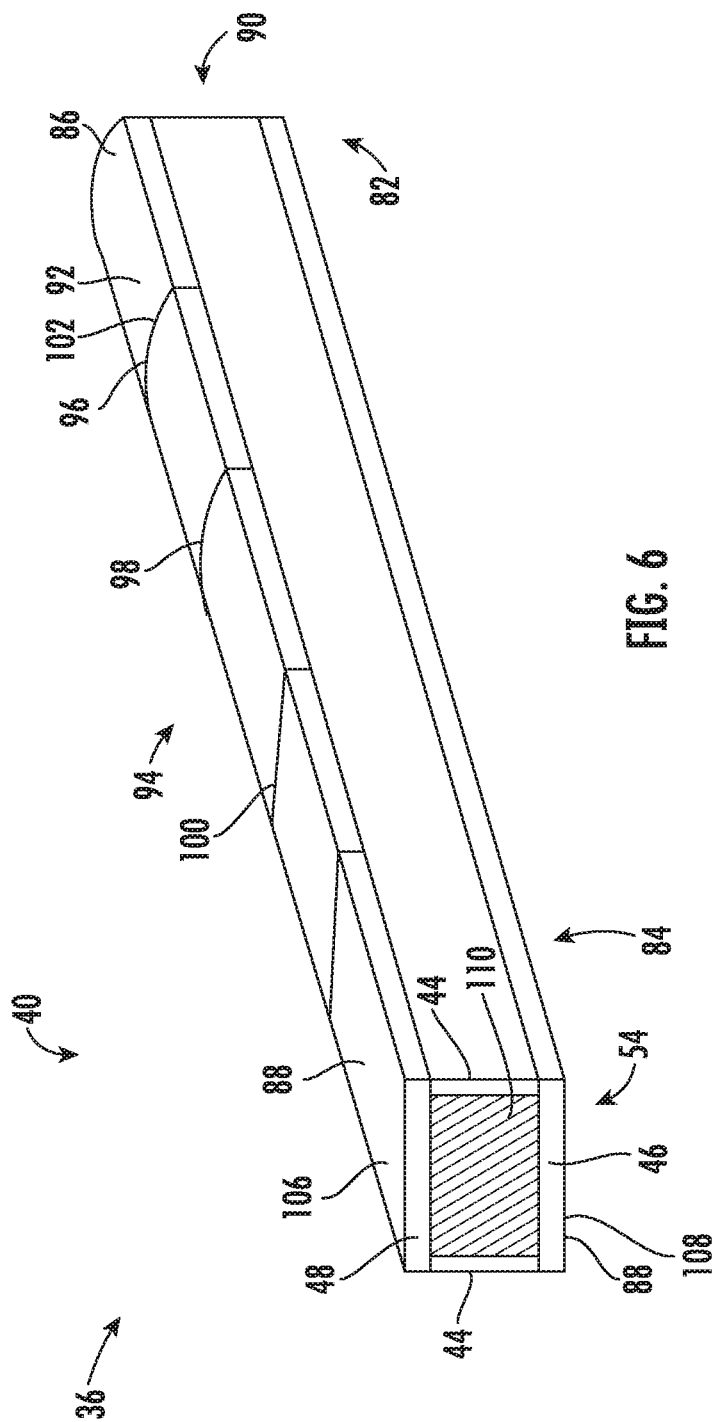
FIG. 6 illustrates a perspective view of one embodiment of a beam structure of the first blade segment according to the present disclosure, particularly illustrating a contacting portion, a joint portion, and a transition region.
Figure 7:
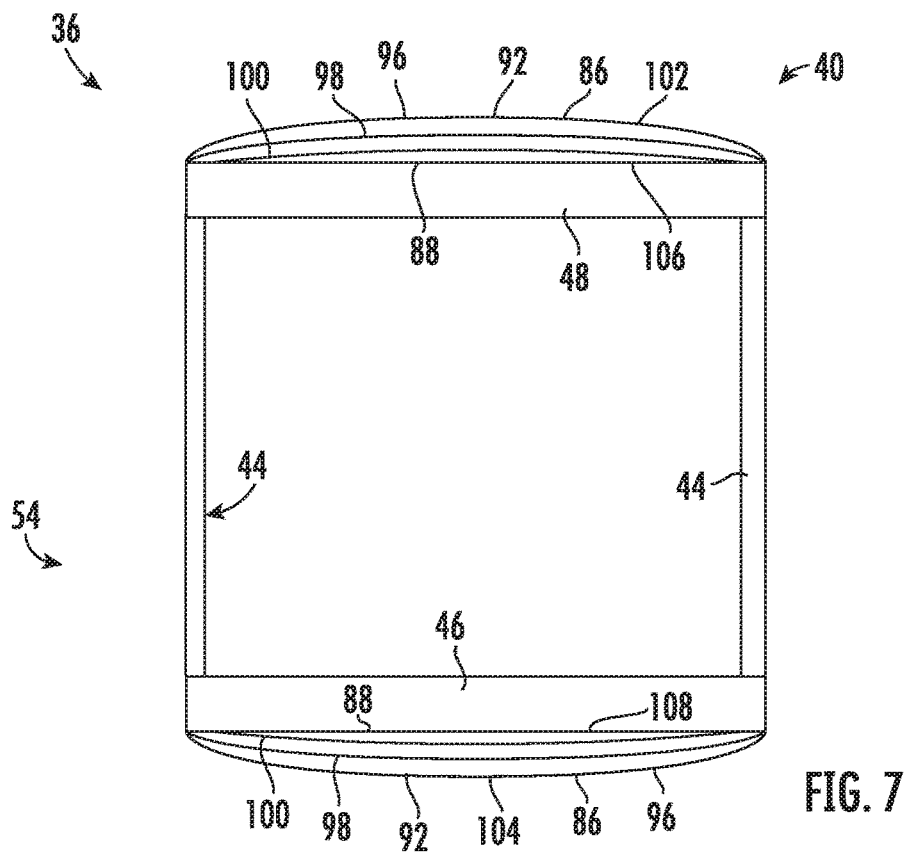
FIG. 7 illustrates a side view of a first end of one embodiment of the beam structure according to the present disclosure, particularly illustrating contoured surfaces and linear surfaces of the contacting portion and joint portion respectively.

Referring now to FIGS. 6 and 7, multiple views of the spar assembly 36 of the first blade segment 30 are illustrated according to aspects of the present disclosure. Particularly, FIG. 6 illustrates a perspective view of the beam structure 40 including a contacting portion 82 and a joint portion 84. FIG. 7 illustrates a side view of the first end 54 of the beam structure 40 particularly illustrating one or more contoured surfaces 86 and one or more linear surfaces 88 of the contacting portion 82 and joint portion 84 respectively. It should be appreciated that the beam structure 40 of FIGS. 6 and 7 may generally be configured the same or similar to the beam structures 40 of FIGS. 2, 3, and 5 and may generally be utilized in the rotor blades 28 of FIGS. 1 and 2. Though, in other embodiments, further configurations of the beam structure 40 are contemplated, such as different cross-sectional shapes and/or additional or fewer spar caps and/or shear webs. For instance, in one embodiment, two spar caps and a shear web may be in an I-beam configuration.

As illustrated, the beam structure 40 may extend from a second end 90 to the first end 54. For instance, when the first blade segment 30 is a tip segment, the beam structure 40 may extend in a span-wise direction from the second end 90 positioned at or approximately at the blade tip 17 to the first end 54 at the chord-wise joint 34 (see, e.g., FIGS. 2 and 5). The contacting portion 82 of the beam structure 40 may extend in the span-wise direction from the second end 90 and includes one or more contoured surfaces 86 oriented toward at least one of an internal surface of pressure side shell member 31 or a suction side shell member 33 of the rotor blade 28 (as shown in FIG. 3). The contoured surface(s) 86 may be an exterior surface 92 of one of the pressure side spar cap 46 and/or the suction side spar cap 48. For instance, as shown in FIG. 6, one contoured surface 86 may be oriented toward the suction side shell member 33. However, as shown in FIG. 7, the exterior surface 92 of the pressure side spar cap 46 may define a contoured surface 86 oriented toward the pressure side shell member 31 (as shown in FIG. 3). Further, the spar caps 46, 48 may be joined together at the second end 90 using any suitable adhesive material or an elastomeric seal. As shown particularly in FIG. 7, it should be recognized that the contacting portion 82 may include one contoured surface 86 oriented toward the pressure side shell member 31 and one contoured surface 86 oriented toward the suction side shell member 33. In another embodiment, the contacting portion 82 may include one contoured surface 86 oriented toward the internal surface of the pressure side shell member 31.

It should also be recognized that the contoured surface(s) 86 may be formed integrally with the beam structure 40. For instance, the contoured surface(s) 86 may be formed integrally with the pressure side spar cap 46 and/or the suction side spar cap 48. However, in other embodiments, the contacting surfaces(s) 86 may be separately attached to the beam structure 40. For instance, one or more fairings defining the contoured surface(s) 86 may be secured to the beam structure 40 at the contacting portion 82. More particularly, in certain embodiments, the fearing(s) may be bonded to the beam structure 40 using an adhesive material.

The contoured surface(s) 86 is configured to follow a contour of one of the pressure side or the suction side of the rotor blade 28. More particularly, a contoured surface 86 oriented toward the pressure side shell member 31 may generally follow an aerodynamic profile of the pressure side shell member 31. Similarly, a contoured surface 86 oriented toward the suction side shell member 33 may generally follow an aerodynamic profile of the pressure side shell member 31. As such, the contoured surface(s) 86 may provide a matting surface for the pressure side shell member 31 and/or the suction side shell member 33 to be coupled to an exterior surface 92 within the contacting portion 82. For instance, the contacting portion 82 may be coupled to the pressure side shell member 31 and/or the suction side shell member 33 between the second end 90 at the blade tip 17 of the rotor blade 28 and the joint portion 84. More particularly, one or both of the pressure or suction side shell members 31, 33 may be bonded to the contoured surface(s) 86 using any suitable adhesive material including but not limited to a polymer, such as a thermoset or thermoplastic. Moreover, the contoured surface(s) 86 may improve the bond between the pressure side shell member 31 and/or the suction side shell member 33 and the contacting portion 82 due to the matting face(s) contoured to match the respective shell member(s) 31, 33. As such, the contoured surface(s) 86 may increase the strength of the first rotor blade segment 30 and/or reducing the possibility of or severity of delamination between the beam structure 40 and the side shell member(s) 31, 33. It should be appreciated that all or substantially all of the contacting portion 82 may be coupled to the pressure side shell member 31 and/or the suction side shell member 33.

As further illustrated in FIGS. 6 and 7, the beam structure 40 may include a joint portion 84 extending in the span-wise direction from the first end 54 toward the contacting portion 82. In certain embodiments, the joint portion 84 may extend from the first end 54 along the span-wise direction to the contacting portion 82 and/or a transition region 94 as described in more detail below. The joint portion 84 may extend out of the first blade segment 30 by a joint length D, as shown in FIG. 3. For instance, the joint portion 84 may define a box beam extending from an open end of the first blade segment 30, e.g., opposite the blade tip 17 of the first blade segment 30. Further, such a box beam may be received by the receiving section 60 of the second blade segment 32 as shown generally in FIG. 5.

The joint portion 84 may include one or more linear surfaces 88, each of linear surface 88 oriented in the same direction as one of the contoured surface(s) 86. For example, the linear surface(s) 88 may be oriented toward at least one of the pressure side shell member 31 and/or the suction side shell member 33. The linear surface(s) 88 of the joint portion 84 may provide a more desirable architecture for joining the first blade segment 30 with the second blade segment 32. For example, as explained in more detail below in regards to FIG. 8, the linear surface(s) 88 of the joint portion 84 may reduce internal stress within the joint portion 84. In certain embodiments, the joint portion 84 may not be directly coupled to the pressure side shell member 31 and/or the suction side shell member 33. As such, the joint portion 84 of the beam structure 40 may be indirectly coupled to the pressure side shell member 31 and/or the suction side shell member 33 through other portions of the beam structure 40, such as the contacting portion 82.

Still referring to the exemplary embodiments of FIGS. 6 and 7, the beam structure 40 may include the transition region 94 between the contacting portion 82 and the joint portion 84 that transitions the contoured surface(s) 86 to the linear surface(s) 88. At least a portion of the transition region 94 may be coupled to the pressure side shell member 31 and/or the suction side shell member 33. For instance, all of the transition region 94 may be coupled to an interior surface of pressure side shell member 31 and/or the suction side shell member 33. In other embodiments, a portion of the transition region 94 may be coupled to the pressure side shell member 31 and/or the suction side shell member 33 while another portion of the transition region 94 is not directly coupled to the pressure side shell member 31 and/or the suction side shell member 33. For example, the portion of the transition region 94 nearest the contacting portion 82 and/or the second end 90 may be coupled to the pressure side shell member 31 and/or the suction side shell member 33. In such an embodiment, the portion of the transition region 94 nearest the joint portion 84 and/or the first end 54 may not be directly coupled to the pressure side shell member 31 and/or the suction side shell member 33. As such, it should be appreciated that the portion of the transition region 94 coupled to pressure side shell member 31 and/or the suction side shell member 33 may more closely resemble the contoured surface(s) 86 of the contacting portion 82. Contrarily, the portion of the transition region 94 that more closely resembles the linear surface(s) 88 of the joint portion 84 may not be directly coupled to the pressure side shell member 31 and/or the suction side shell member 33.

In one embodiment, as shown, the contoured surface(s) 86 may include a first radius of curvature 96. For example, in one embodiment, the contacting portion 82 may be defined by the segment of the beam structure 40 at the second end 90 that includes the first radius of curvature 96 on the exterior surface 92. Further, as illustrated, the transition region 94 may include a second radius of curvature 98 greater than the first radius of curvature 96. In additional embodiments, the transition region 94 may include a plurality of radii of curvature arranged between the contacting portion 82 and the joint portion 84. Additionally, each radius of curvature of the plurality of radii of curvature may increase between the contacting portion 82 and the joint portion 84. Moreover, the radii of curvature defined by the transition region 94 may smoothly convert the contoured surface(s) 86 of the contacting portion 82 to the linear surface(s) 88 of the joint portion 84. More particularly, in the depicted embodiment, the transition region 94 may include a third radius of curvature 100 greater than the second radius of curvature 98 and arranged between the second radius of curvature 98 and the joint portion 84 along the span. As such, it should be appreciated that the exterior surface 92 may more closely resemble the contacting portion 82 at the second radius of curvature 98 and more closely resemble the joint portion 84 at the third radius of curvature 100. Additionally, in certain embodiments, the contacting portion 82 may extend along 50% or less of the length of the beam structure 40 in the span-wise direction. Further, the transition region 94 may extend from about 30% to about 40% of the length of the beam structure 40 in the span-wise direction.

Though two distinct radii of curvature are illustrated within the transition region 94, it should be recognized that the transition region 94 may include more radii of curvature, such as three or more. Further, in certain embodiments, the transition region 94 may define a smooth transition including an infinite or near infinite number of radii of curvature. Still, in other embodiments, the transition region 94 may define two or more distinct radii of curvature defining distinct sections of the transition region 94.

Referring now particularly to FIG. 7, the contacting portion 82 of the beam structure 40 may further include a plurality of contoured surfaces 86. For instance, the plurality of contoured surfaces 86 may include a first contoured surface 102 oriented toward the internal surface of the suction side shell member 33 of the rotor blade 28 and a second contoured surface 104 oriented toward the internal surface of the pressure side shell member 31 of the rotor blade 28. In one such embodiment, the joint portion 84 of the beam structure 40 may further include a plurality of linear surfaces 88. Additionally, the plurality of linear surfaces 88 may include a first linear surface 106 oriented toward the internal surface of the suction side shell member 33 of the rotor blade 28 and a second linear surface 108 oriented toward the internal surface of the pressure side shell member 31 of the rotor blade 28. In one such embodiment, the transition region 94 may transition the first and second contoured surfaces 102, 104 into the first and second linear surfaces 106, 108. For instance, the transition region 94 may transition the first contoured surface 102 into the first linear surface 106 and the second contoured surface 104 into the second linear surface 108.

In one exemplary embodiment, the first and second contoured surfaces 102, 104 may form part of the suction side spar cap 48 and the pressure side spar cap 46, respectively. For example, the first and second contoured surfaces 102, 104 may be defined by the exterior surfaces 92 of the suction side spar cap 48 and the pressure side spar cap 46. As illustrated in FIG. 6, in certain embodiments, the beam structure 40 may further include a filler material 110 positioned between the pressure side spar cap 46 and the suction side spar cap 48. The filler material 110 may generally extend along the full length of the beam structure 40 from the first end 54 to the second end 90. However, in other embodiments, the filler material 110 may only fill a portion of the beam structure 40, such as the joint portion 84 and/or the transition region 94. The filler material 110 may include at least one foam material, a wood material, a cork material, or combinations thereof.

It should be recognized that the linear surfaces 106, 108 together with the shear web(s) 44 of the joint portion 84 may define an orthogonal or approximately orthogonal box beam extending from the open end of the first blade segment 30, e.g., the end of the first blade segment 30 at the chord-wise joint 34. For instance, the joint portion 84 and/or box beam extending from the open end of the first blade segment 30 may generally define a box or rectangular cross-sectional shape. The orthogonal shape of the box beam may provide a more desirable mating architecture for inserting into the receiving section 60 of the second blade segment 32. Further, it should be appreciated that the orthogonal or approximately orthogonal shape of the joint portion 84 and/or box beam may reduce internal stress within the first end 54 of the beam structure 40.

In further embodiments, the beam structure 40 may include the joint portion 84 on both the first end 54 and the second end 90. For instance, an intermediate blade segment may include the beam structure 40 extending from both ends of the intermediate blade segment. In such an embodiment, the contacting portion may be positioned at or approximately at the middle of the beam structure 40. As such, the beam structure 40 may include one or more transition regions 94 between the contacting portion 82 and joint portions 84 at each end 54, 90 of the beam structure 40. In other embodiments, one end of such a beam structure 40 may include a receiving section 60 while the opposite end may include the joint portion 84. As such, the receiving section 60 may include the contacting portion 82.

Figure 8:
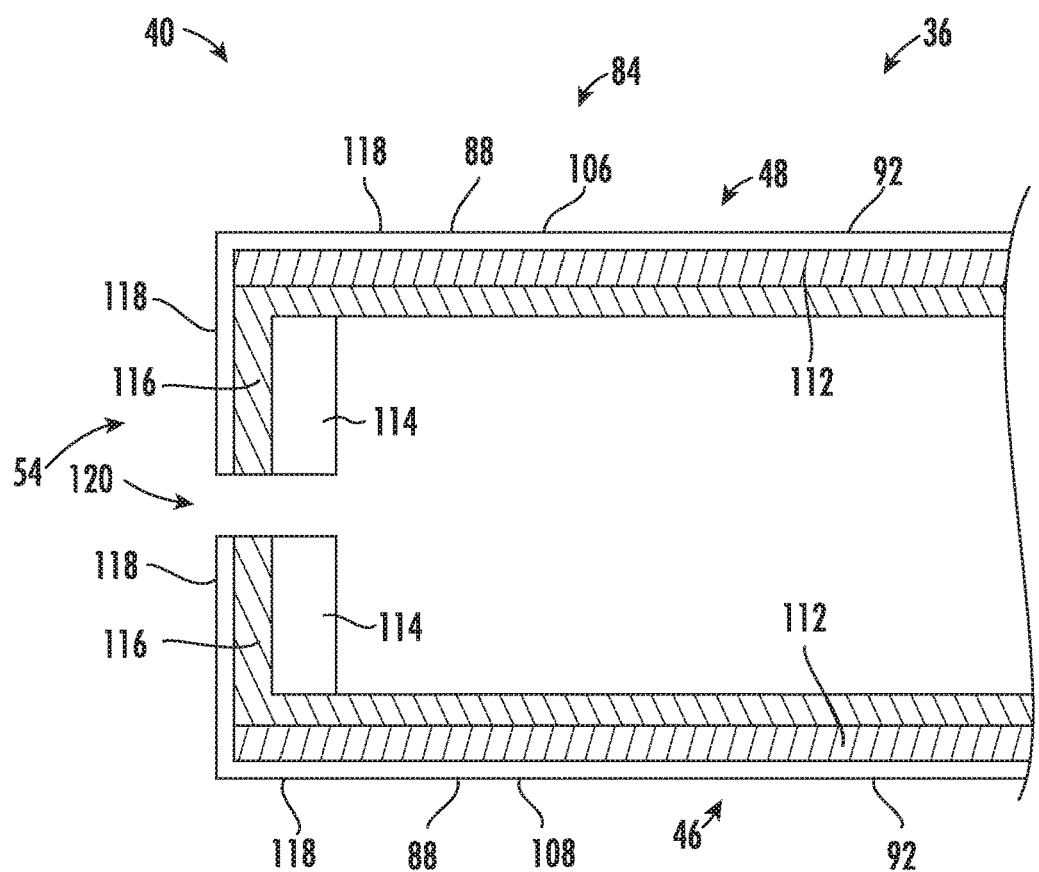
FIG. 8 illustrates one embodiment of the first end of the beam structure according to the present disclosure, particularly illustrating a cross-section of a closed first end of the beam structure along the span; and, FIG. 9 illustrates a flow chart of one embodiment of a method of forming the beam structure of a spar assembly for a rotor blade according to the present disclosure.

Referring now to FIG. 8, one embodiment of the first end 54 of the beam structure 40 is illustrated according to aspects of the present subject matter. Particularly, FIG. 8 illustrates a cross-section of a closed first end 54 of the beam structure 40. It should be appreciated that although FIG. 8 is illustrated with a particular configuration of layers, other configuration of the first end 54 are contemplated that may include additional or less layers or components.

As shown, the joint portion 84 may include one or more pultruded carbon composite plies or plates 112. For example, the pressure side and/or suction side spar caps 46, 48 may include pultruded carbon composite ply(ies) 112 extending generally from the transition region 94 and/or the contacting portion 82. The pultruded carbon composite ply(ies) 112 may provide rigidity to the spar assembly 36 and/or beam structure 40. Such pultruded carbon composite plies 112 may have generally have a higher strength than composites including other fibers or non-pultruded plies. However, the rigidity of the pultruded carbon composite ply(ies) 112 may also cause difficulty conforming the shape of the pultruded carbon composite ply(ies) 112 to the orthogonal shape of first end 54 while also defining the curved profiles of the transition region 94 and/or the contacting portion 82. As such, the first end 54 may include additional materials, such as other composite materials, that may more easily define the desired orthogonal shape and/or box beam shape of the first end 54 of the beam structure 40 while providing the strength necessary to join the first blade segment 30 to the second blade segment 32 at the chord-wise joint 34.

For example, as shown, the pultruded carbon composite ply(ies) 112 may be exchanged for other composite materials at the first end 54. The joint portion 84 may include one or more blocks 114 positioned at the first end 54 to at least partially contribute to the box beam shape of the first end 54. The joint portion 84 may further include one or more internal plies 116 arranged between the block(s) 114 and the exterior surface 92 of the pressure and/or suction side spar caps 46, 48. In other embodiments, one or more additional internal plies 116 may be arranged inside the block(s) 114. Further, in certain embodiments, the internal plies 116 may include one or more wraps or clips, such as c-clips. Moreover, as depicted, the beam structure 40 may include one or more external plies 118. For example, the external plies 118 may define the exterior surface 92 of the spar caps 46, 48, the linear surface(s) 88, 106, 108 and/or the first end 54. The block(s) 114, internal ply(ies) 116, and/or external ply(ies) 118 may be formed from biax composite plies and/or unidirectional composite plies including glass fibers, carbon fibers, polymer fibers, wood fibers, bamboo fibers, ceramic fibers, nanofibers, metal fibers, or combinations thereof. Additionally, as shown, a cavity 120 may be formed at the first end 54 (e.g., drilled or bored into the first end 54) in order to couple the bolt tube 52 to the first end 54 (see, e.g., FIG. 3). Further, in certain embodiments the block(s) 114, internal ply(ies) 116, and/or external ply(ies) 118 may be pre-formed, pre-fabricated, and/or laid up with the beam structure 40.

Referring still to the exemplary embodiment of FIG. 8, the closed end (e.g., the first end 54) of the beam structure 40 may be formed by wrapping one or more composite plies around the first end 54. In one embodiment, composite ply(ies) used to form the linear surface(s) 88, 106, 108 of the pressure side spar cap 46 and/or the suction side spar cap 48 may wrap around the first end 54 of the beam structure 40 to form the closed end. For instance, the internal ply(ies) 116 may wrap around the block(s) 114 at the first end 54. Further, the external plies 118 may wrap around the internal ply(ies) 116 and/or block(s) 114 at the first end 54 to close the first end 54. However, it should be appreciated that pressure side spar cap 46, suction side spar cap 48, and/or first end 54 may each include a separate external ply 118. It should also be recognized that one or more of the plies 116, 118 that wrap around the first end 54 may extend from the first linear surface 106 around the first end 54 to the second linear surface 108 or vice versa.

It should be appreciate that in a joint portion 84 without the linear surface(s) 88, 106, 108, e.g., a non-orthogonal beam structure 40, plies 116, 118 wrapped around the first end 54 from the pressure side of the beam structure 40 or the suction side of the beam structure 40 may create defects such as wrinkles and/or draping issues within the composite ply(ies) 116, 118. Further, such defects may create localized regions of increased stress within the beam structure 40 when subjected to a load. For instance, the completed rotor blade 28 of the wind turbine 10 may experience aerodynamic loads that cause the rotor blades 28 to rotate. Moreover, such aerodynamic loads may create localized stress regions at any defects present within the beam structure 40 and eventually lead to structural failures, such as delamination. However, a joint portion 84 with linear surface(s) 88, 106, 108 such as an orthogonal joint portion 84, may help to prevent wrinkles within the composite ply(ies) 116, 118 wrapped between the pressure side and suction sides of the beam structure 40. Thus, transitioning the contoured surface(s) 86, 102, 104 of the contacting portion 82 to the linear surface(s) 88, 106, 108 of the joint portion 84 may reduce the number of or severity of structural defects within the beam structure 40.

In further embodiments, the block(s) 114 and/or ply(ies) 112, 116, 118 may include a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as described briefly above, the block(s) 114 and/or ply(ies) 112, 116, 118 may be reinforced with one or more fiber materials. In such embodiments, the fiber material(s) may include glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

Figure 9:
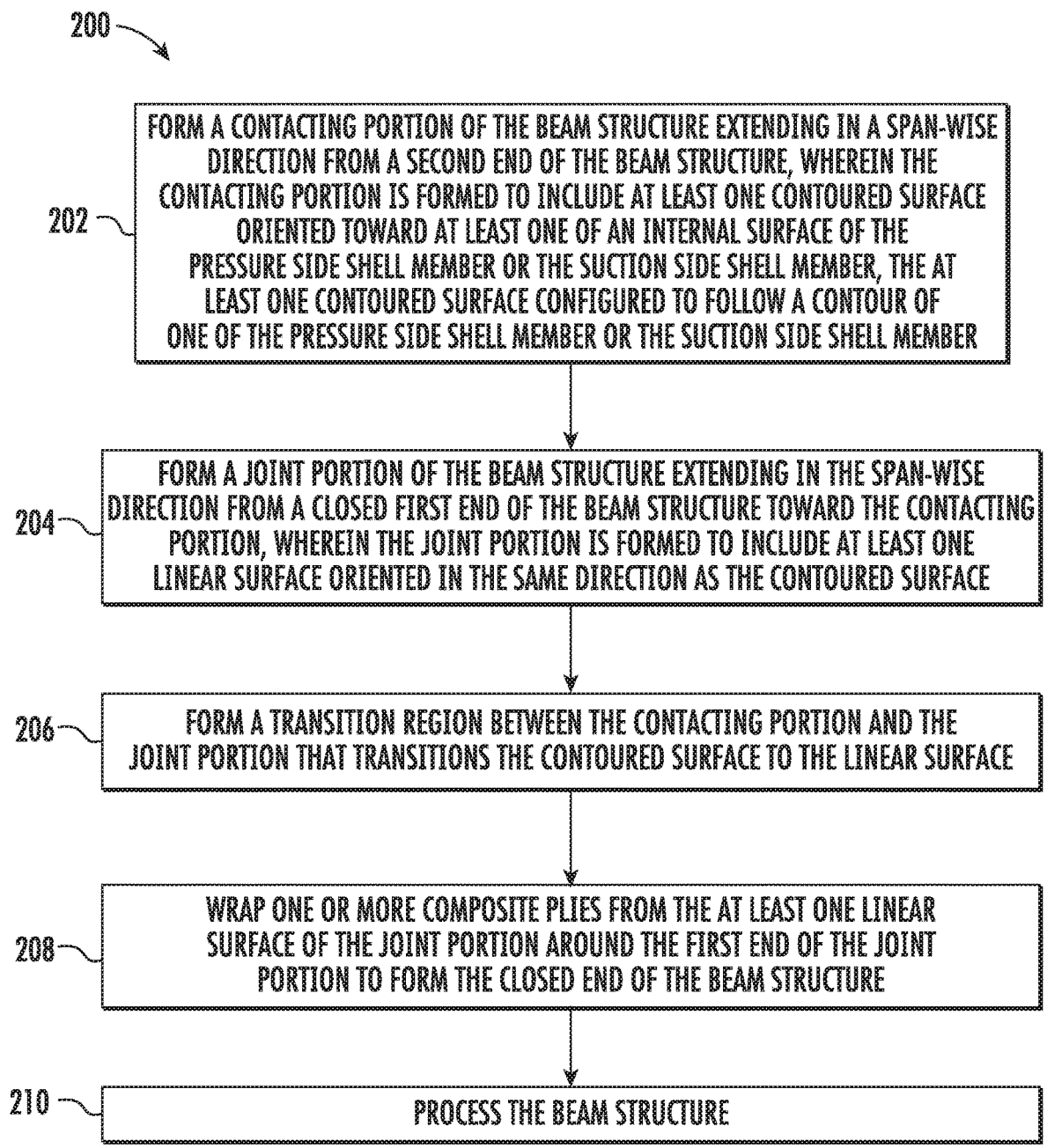

Referring now to FIG. 9, a flow chart 200 of a method of forming a beam structure of a spar assembly for a rotor blade is depicted according to the present disclosure. In general, the method 200 will be described herein with reference to the spar assembly 36 and the beam structure 40 shown in FIGS. 2-8. However, it should be appreciated that the disclosed method 200 may be implemented with spar assemblies 36 having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include forming the contacting portion 82 of the beam structure 40 extending in a span-wise direction from the second end 90. The contacting portion 82 may be formed to include one or more contoured surfaces 86 oriented toward at least one of an internal surface of the pressure side shell member 31 or the suction side shell member 33. Further, the contoured surface(s) 86 may be configured to follow a contour of one of the pressure side shell member 31 or the suction side shell member 33. The method 200 may additionally include, at (204), forming a joint portion 84 of the beam structure 40 extending in the span-wise direction from a closed first end 54 of the beam structure 40 toward the contacting portion 82. Additionally, the joint portion 84 may be formed to include one or more linear surfaces 88 oriented in the same direction as the contoured surface(s) 86. As depicted at (206), the method 200 may further include forming a transition region 94 between the contacting portion 82 and the joint portion 84 that transitions the contoured surface(s) 86 to the linear surface(s) 88. One step (208) of the method 200 may include wrapping one or more composite plies 116, 118 from the linear surface(s) 88 of the joint portion 84 around the first end 54 of the joint portion 84 to form the closed end of the beam structure 40.

In one embodiment of the method 200, forming the contacting portion 82 and/or the transition region 94 may include laying up the contacting portion 82 and/or the transition region 94 in a hard tool. For instance, the hard tool may act as a mold to define the exterior surface 92 of the pressure side and/or suction side spar caps 46, 48. In such an embodiment, the hard tool may define the contoured surface(s) 86, the transition region 94, or both. As such, the spar cap(s) 46, 48 may be formed from the exterior j surface(s) 92 inward. It should also be appreciated that the joint portion 84 may also be laid up within the hard tool. Moreover, the hard tool may act as a mold for the pressure side and/or suction side of the entire beam structure 40. In certain embodiments, the hard tool may be an autoclave.

In another embodiment, forming the contacting portion 82 and/or the transition region 94 may include laying up the contacting portion 82 and/or the transition region 94 around an internal tooling mandrel. For instance, the tooling mandrel may act as a mold to lay up one or more layers of the pressure side and/or suction side spar caps 46, 48 from an interior surface to the exterior surface 92. As such, the tooling mandrel may be configured to define the contoured surface(s) 86, the transition region 94, or both. More particularly, each successive layer of the spar cap(s) 46, 48 may be laid up with the shape provided by the previous layer and/or the tooling mandrel. As such, the exterior surface(s) 92 of the spar cap(s) 46, 48 may include the contoured surface(s) 86 and/or transition region 94 defined by the tooling mandrel. It should also be appreciated that the joint portion 84 may be laid up around the tooling mandrel. Moreover, the tooling mandrel may act as a mold for the pressure side and/or suction side of the entire beam structure 40.

As shown at (210), the method 200 may further include processing the beam structure 40. In one embodiment, processing the beam structure 40 may include processing one or more of the composite plies 112, 116, 118. For example processing beam structure 40 may include compacting the composite plies 112, 116, 118. In another embodiment of the method 200, processing the composite plies 112, 116, 118 may include autoclaving the composite plies 112, 116, 118. In a still further embodiment of the method 200, processing the composite plies 112, 116, 118 may include both compacting and autoclaving the composite plies 112, 116, 118. For instance, the composite plies 112, 116, 118 may be compacted and then processed in an autoclave. The compaction may be performed at atmosphere, i.e., at room temperature and pressure. The autoclave cycle may impart stiffness to the final ply and/or layup assembly through complete drying and/or curing of the composite constituents and produces the final dimensions of the beam structure 40 through full consolidation of the plies and/or sub-assemblies.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A spar assembly for a rotor blade of a wind turbine, the spar assembly comprising:
    a beam structure extending between a closed first end and a second end, the beam structure configured for coupling within a shell of the rotor blade, the beam structure comprising:
    a contacting portion extending in a span-wise direction from the second end and comprising at least one contoured surface oriented toward at least one of an internal surface of a pressure side or a suction side of the rotor blade, the contoured surface configured to follow a contour of one of the pressure side or the suction side of the rotor blade;
    a joint portion extending in the span-wise direction from the first end toward the contacting portion, the joint portion comprising at least one linear surface oriented in the same direction as the contoured surface;
    a transition region between the contacting portion and the joint portion that transitions the contoured surface to the linear surface; and,
    one or more internal plies, external plies, or combinations thereof, and wherein at least one internal ply, or external ply is pre-formed or pre-fabricated and laid up with the beam structure, wherein the at least one external ply comprises at least one composite ply, wherein the closed first end comprises a wrap of the at least one composite ply from the at least one linear surface of the joint portion around the first end of the joint portion to define the closed first end.

2. The spar assembly of claim 1, wherein the contacting portion extends along 50% or less of a length of the beam structure.

3. The spar assembly of claim 2, wherein the transition region extends from 30% to 40% of the length of the beam structure.

4. The spar assembly of claim 1, wherein the contoured surface comprises a first radius of curvature, and the transition region comprising a second radius of curvature greater than the first radius of curvature.

5. The spar assembly of claim 1, wherein the transition region comprises a plurality of radii of curvature arranged between the contacting portion and the joint portion, and wherein each radius of curvature of the plurality of radii of curvature increases between the contacting portion and the joint portion.

6. The spar assembly of claim 1, wherein the contacting portion of the beam structure further comprises a plurality of contoured surfaces, the plurality of contoured surfaces comprising a first contoured surface oriented toward the internal surface of the suction side of the rotor blade and a second contoured surface oriented toward the internal surface of the pressure side of the rotor blade.

7. The spar assembly of claim 6, wherein the joint portion of the beam structure further comprises a plurality of linear surfaces, the plurality of linear surfaces comprising a first linear surface oriented toward the internal surface of the suction side of the rotor blade and a second linear surface oriented toward the internal surface of the pressure side of the rotor blade.

8. The spar assembly of claim 7, wherein the transition region transitions the first and second contoured surfaces into the first and second linear surfaces.

9. The spar assembly of claim 7, wherein the first and second contoured surfaces form part of a suction side spar cap and a pressure side spar cap, respectively, the beam structure further comprising at least one shear web extending between the suction side spar cap and the pressure side spar cap.

10. The spar assembly of claim 1, wherein the at least one contoured surface is formed integrally with the beam structure or separately attached to the beam structure.

11. The spar assembly of claim 1, wherein the beam structure further comprises:
    one or more internal blocks, and wherein at least one internal block is pre-formed or pre-fabricated and laid up with the beam structure.

12. A rotor blade for a wind turbine, comprising:
    a first blade segment and a second blade segment extending in opposite directions from a chord-wise joint, each of the first and second blade segments comprising a pressure side shell member, a suction side shell member, and a spar assembly, wherein the spar assembly of the first blade segment includes a beam structure extending between a closed first end at the chord-wise joint and a second end, the beam structure configured for coupling within a shell of the rotor blade, the beam structure comprising:
    a contacting portion extending in a span-wise direction from the second end and comprising at least one contoured surface oriented toward at least one of an internal surface of the pressure side shell member or the suction side shell member, the contoured surface configured to follow a contour of one of the pressure side shell member or the suction side shell member;
    a joint portion extending in the span-wise direction from the first end toward the contacting portion, the joint portion comprising at least one linear surface oriented in the same direction as the contoured surface;
    a transition region between the contacting portion and the joint portion that transitions the contoured surface to the linear surface; and,
    one or more internal plies, external plies, or combinations thereof, and wherein at least one internal ply, or external ply is pre-formed or pre-fabricated and laid up with the beam structure, wherein the at least one external ply comprises at least one composite ply, wherein the closed first end comprises a wrap of the at least one composite ply from the at least one linear surface of the joint portion around the first end of the joint portion to define the closed first end.

13. The rotor blade of claim 12, wherein the contoured surface comprises a first radius of curvature, and the transition region comprising a second radius of curvature greater than the first radius of curvature.

14. The rotor blade of claim 12, wherein the transition region comprises a plurality of radii of curvature arranged between the contacting portion and the joint portion, and wherein each radius of curvature of the plurality of radii of curvature increases between the contacting portion and the joint portion.

15. The rotor blade of claim 12, wherein the contacting portion of the beam structure further comprises a plurality of contoured surfaces, the plurality of contoured surfaces comprising a first contoured surface oriented toward the internal surface of the suction side shell member and a second contoured surface oriented toward the internal surface of the pressure side shell member, and wherein the joint portion of the beam structure further comprises a plurality of linear surfaces, the plurality of linear surfaces comprising a first linear surface oriented toward the internal surface of the suction side of the rotor blade and a second linear surface oriented toward the internal surface of the pressure side of the rotor blade.

16. The rotor blade of claim 15, wherein the transition region transitions the first and second contoured surfaces into the first and second linear surfaces.

17. The rotor blade of claim 15, wherein the first and second contoured surfaces form part of a suction side spar cap and a pressure side spar cap, respectively, the beam structure further comprising at least one shear web extending between the suction side spar cap and the pressure side spar cap.

18. A method of forming a beam structure of a spar assembly for a rotor blade, the rotor blade including a pressure side shell member and a suction side shell member, the method comprising:

forming a contacting portion of the beam structure extending in a span-wise direction from a second end of the beam structure, wherein the contacting portion is formed to include at least one contoured surface oriented toward at least one of an internal surface of the pressure side shell member or the suction side shell member, the at least one contoured surface configured to follow a contour of one of the pressure side shell member or the suction side shell member;

forming a joint portion of the beam structure extending in the span-wise direction from a closed first end of the beam structure toward the contacting portion, wherein the joint portion is formed to include at least one linear surface oriented in the same direction as the contoured surface;

forming a transition region between the contacting portion and the joint portion that transitions the contoured surface to the linear surface;

wrapping one or more composite plies from the at least one linear surface of the joint portion around the first end of the joint portion to form the closed end of the beam structure; and, processing the beam structure, wherein processing may include at least one of compacting or autoclaving the one or more composite plies.

19. The method of claim 18, wherein forming at least one of the contacting portion or the transition region comprises laying up at least one of the contacting portion or the transition region in a hard tool, wherein the hard tool defines the at least one contoured surface, the transition region, or both.

20. The method of claim 18, wherein forming at least one of the contacting portion or the transition region comprises laying up at least one of the contacting portion or the transition region around an internal tooling mandrel, wherein the tooling mandrel is configure to define the at least one contoured surface, the transition region, or both.

* * * * *